(12) United States Patent
Sashide et al.

(10) Patent No.: US 6,260,692 B1
(45) Date of Patent: Jul. 17, 2001

(54) CONVEYOR BELT

(75) Inventors: Kazuo Sashide; Shigeyasu Tanaka; Osamu Shinohara; Yuji Shimotashiro; Teruo Suzuki; Osamu Toda; Ichiro Yamamoto; Shinichi Katsumata; Kojiro Mori; Yoshimitsu Fukuchi, all of Hiratsuka (JP)

(73) Assignee: Yokohama Rubber Co., LTD, Tokyo (JP)

( * ) Notice: Subject to any disclaimer, the term of this patent is extended or adjusted under 35 U.S.C. 154(b) by 0 days.

(21) Appl. No.: 09/147,382
(22) PCT Filed: May 12, 1997
(86) PCT No.: PCT/JP97/01587
 § 371 Date: Dec. 14, 1998
 § 102(e) Date: Dec. 14, 1998
(87) PCT Pub. No.: WO98/00355
 PCT Pub. Date: Jan. 8, 1998

(30) Foreign Application Priority Data

Jul. 2, 1996  (JP) ..................... 8-172632

(51) Int. Cl.$^7$ ................................. B65G 15/34
(52) U.S. Cl. ........................... 198/847; 198/957
(58) Field of Search ..................... 198/847, 957

(56) References Cited

U.S. PATENT DOCUMENTS

| | | | |
|---|---|---|---|
| 4,154,335 * | 5/1979 | Burnett et al. | 198/847 |
| 4,226,417 * | 10/1980 | Camilleri | 198/847 |
| 4,243,714 * | 1/1981 | Vanassche et al. | 198/847 |
| 4,302,197 * | 11/1981 | Kimura et al. | 198/847 |
| 4,305,433 * | 12/1981 | Vanassache et al. | 198/847 |
| 4,449,627 * | 5/1984 | Kell | 198/847 |
| 4,504,258 * | 3/1985 | Tanaka et al. | 198/847 |
| 4,518,647 * | 5/1985 | Morrison | 198/847 |
| 4,526,637 * | 7/1985 | Long | 198/847 |
| 4,533,420 * | 8/1985 | Wetzel | 198/847 |
| 4,547,422 * | 10/1985 | Oliver et al. | 198/847 |
| 4,650,068 * | 3/1987 | Vanassche et al. | 198/847 |
| 4,682,973 * | 7/1987 | Fujita et al. | 198/847 |
| 4,823,942 * | 4/1989 | Martin et al. | 198/847 |
| 5,002,178 * | 3/1991 | Yamada | 198/847 |
| 5,004,098 * | 4/1991 | Marshall | 198/847 |
| 5,062,924 * | 11/1991 | McCarten | 198/847 |
| 5,326,411 * | 7/1994 | Arnold | 198/847 |
| 5,422,165 * | 6/1995 | Arnold | 198/847 |
| 5,460,261 * | 10/1995 | Kusel et al. | 198/847 |
| 5,595,284 * | 1/1997 | Takahashi et al. | 198/847 |
| 5,609,242 * | 3/1997 | Hutchins et al. | 198/847 |
| 5,685,417 * | 11/1997 | Hasegawa et al. | 198/847 |

FOREIGN PATENT DOCUMENTS

PCT/JP97/
01587 * 12/1998 (JP) .

* cited by examiner

Primary Examiner—Douglas Hess
(74) Attorney, Agent, or Firm—Arent Fox Kintner Plotkin & Kahn, PLLC

(57) ABSTRACT

A conveyor belt having a reinforcing layer of a synthetic fiber woven fabric embedded between an upper surface cover and a lower surface cover, wherein an elongation at break of the synthetic fiber woven fabric in a belt longitudinal direction is at least 25% and an elongation at a load 10% of a guarantee strength is not greater than 1.5%.

11 Claims, 3 Drawing Sheets

CONVEYOR BELT

TECHNICAL FIELD

This invention relates to a conveyor belt reinforced by a synthetic fiber woven fabric. More particularly, the present invention relates to a conveyor belt which exhibits a small elongation in the course of its use for an extended period and is hardly damaged by foreign matters caught between pullies and a conveyor belt.

BACKGROUND ART

Woven fabrics of a nylon fiber or a polyester fiber have been used in the past as a reinforcing layer of conveyor belts.

However, the conveyor belt of this kind is likely to be damaged due to abnormal deformation that occurs when foreign matters such as a cake adhering to pullies and falling transported materials are caught between the pullies and the conveyor belt. Even though abnormal deformation is not of the level which directly results in the damage of the belt, repetition of such abnormal deformation lowers the strength of the belt due to its fatigue and consequently, the conveyor belt cannot withstand an extended use.

In the conveyor belt of this kind, elongation occurs in a longitudinal direction of the belt in the course of use of the belt, and the belt is elongated as a whole. In such a case, the length of the conveyor machine must be regulated by adjusting the stroke of a take-up device disposed in front, or at the back, of the belt conveyor machine. As this elongation proceeds further and the stroke of the take-up device cannot absorb the elongation any longer, the belt must be cut short.

Consequently, the inventors of the present invention have examined from various aspects the damage and fatigue of the conveyor belt resulting from the abnormal deformation that occurs when any foreign matters are caught between the pullies and the conveyor belt, and means for reducing the elongation of the belt that occurs in the course of use. As a result, the present inventors have found it effective to increase, as much as possible, elongation at break of a synthetic fiber woven fabric constituting a reinforcing layer of a conveyor belt in the belt longitudinal direction to cope with the breakage and the fatigue of the belt resulting from abnormal deformation, and to reduce, as much as possible, the elongation of the synthetic fiber woven fabric in the belt longitudinal direction during its use to cope with the elongation of the belt.

DISCLOSURE OF INVENTION

The present invention is completed to solve these problems of the prior art and aims at providing a conveyor belt which is difficult to be damaged even when any foreign matters are caught between pullies and a conveyor belt and which exhibits a small elongation of a belt during the use of the belt.

According to the present invention, damage and the drop of the strength hardly occur even when foreign matters such as the cake adhering to the pullies and the falling transported materials are caught between the pullies and the conveyor belt, the conveyor belt can be used for a long time, the elongation of the entire belt is small, the adjustment of the machine length is not much required and hence, the cutting-short operation of the belt is hardly necessary, and the stroke of the take-up device can be reduced. Further, the number of workers and the cost for maintenance and inspection can be reduced.

In a conveyor belt having a reinforcing layer of a synthetic fiber woven fabric embedded between an upper surface cover and a lower surface cover, the object of the present invention described above can be accomplished by a synthetic fiber woven fabric characterized in that an elongation at break of the synthetic fiber woven fabric in a belt longitudinal direction is at least 25% and an elongation at a load 10% of guarantee strength is not greater than 1.5%.

Yarns of a high elongation polyester or high elongation nylon having an elongation at break of at least 25% can be used as warps of the synthetic fiber woven fabric.

A woven fabric formed by alternately arranging one to three warps of a polyester fiber and one to three warps of a nylon fiber can be used as the synthetic fiber woven fabric described above. In this case, the elongation at break of the warps may be less than 25%.

Mix-twisted yarns of the polyester fiber and the nylon fiber can be used as the warps of the synthetic fiber woven fabric described above. A polyester having a high or normal elongation and a nylon having a high or normal elongation can be used as the fiber material in this case.

The yarns used for the synthetic fiber woven fabric are used preferably after they are treated with an adhesive solution, and the temperature of the adhesive solution for the warps in this case is preferably not lower than 200° C. The tension applied to the yarns at the time of the adhesive solution treatment, that is, a set tension, is preferably small, for example, 0.2 g/denires, and may be zero, too.

A woven fabric having a structure in which the warps and the wefts are linearly arranged and are woven by entwining them by twining yarns, that is, a so-called "unicorn fabric", is suitable for the synthetic fiber woven fabric described above. Further, the synthetic fiber woven fabric is preferably a tyre fabric of synthetic fibers.

BEST MODE FOR CARRYING OUT THE INVENTION

Figure 1:
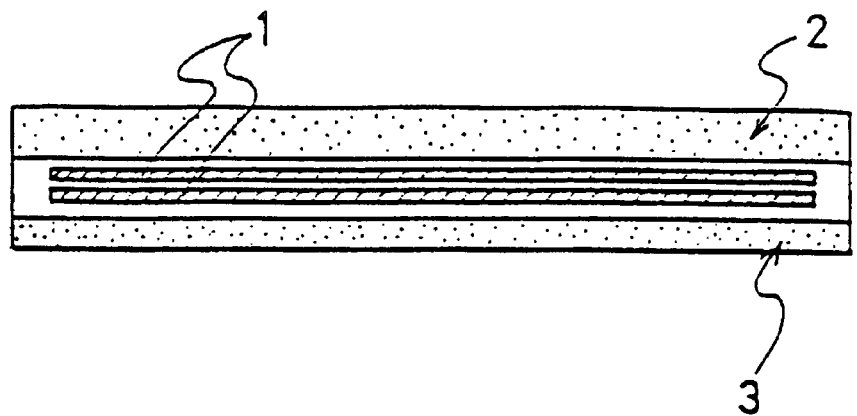
FIG. 1 is a sectional view of a conveyor belt according to the present invention.

FIG. 1 is a transverse sectional view showing the construction of a conveyor belt according to the present invention, and a reinforcing layer 1 is embedded between an upper surface cover 2 and a lower surface cover 3.

Each of the upper surface cover 2 and the lower surface cover 3 is made of a flexible material such as a natural rubber, a synthetic rubber and a synthetic resin, and the reinforcing layer 1 is made of a synthetic fiber woven fabric. The upper surface cover 2, the reinforcing layer 1 and the lower surface cover 3 are bonded to one another.

The synthetic fiber woven fabric constituting the reinforcing layer 1 has an elongation at break of at least 25%, preferably 27% to 35%, in its longitudinal direction (in the belt longitudinal direction), and an elongation when a load corresponding to 10% of its guarantee strength, that is, at a load 10% of the guarantee strength, is not greater than 1.5% and preferably, 0.5% to 1.3%.

The material of the warp of the synthetic fiber woven fabric is preferably a high elongation polyester fiber or a high elongation nylon fiber each having an elongation at break of at least 25% in the form of an unprocessed raw yarn. A woven fabric which has an elongation at break of at least 25% in the longitudinal direction and an elongation at the 10% load of not greater than 1.5% and which is subjected to the bonding treatment can be obtained by using the raw yarns of these materials.

A synthetic fiber woven fabric suitable for the present invention can be obtained by using a woven fabric produced by alternately arranging one to three warps of the polyester fiber and one to three warps of the nylon fiber. This is because the polyester fiber reduces the elongation at the 10% load and the nylon fiber increases the elongation at break. However, if four or more warps made of the same material are arranged, flatness of the belt is likely to be lost.

Incidentally, the elongation at break of each of the polyester fiber and the nylon fiber may be not greater than 25% in this case. Further, the number of the warps of the polyester fiber and that of the warps of the nylon fiber need not be equal. For example, they may be arranged at a ratio of 1:2 or 1:3.

A synthetic fiber woven fabric suitable for the present invention can also be obtained by using a combined filament yarn of the polyester fiber and the nylon fiber because of the same function and effect as described above.

Fiber yarns of polyester, nylon, etc, are used as the wefts of the synthetic fiber woven fabric, and the elongation at break is preferably from 30% to 80%. If it is less than 25%, the wefts are cut off in most case before the warps are cut off.

In order to bond the upper surface cover 2, the reinforcing layer 1 and the lower surface cover 3, the warps and the wefts of the synthetic fiber woven fabric are preferably treated with the adhesive solution. In this case, the temperature of the treating solution of the warps is not lower than 200° C. and preferably from 200° C. to 240° C. in order to keep the elongation at break of the warps after this treatment at a satisfactory level.

The adhesive solution treatment is carried out while a considerable tension is being applied to the yarns. If the tension in this case, that is, a set tension, is not higher than 0.2 g/deniers, the elongation at break of the warps after the treatment can be kept satisfactory. The set tension of the warps may be zero, too. A resorcin formalin rubber latex (RFL), for example, can be used as the adhesive solution.

Figure 4:
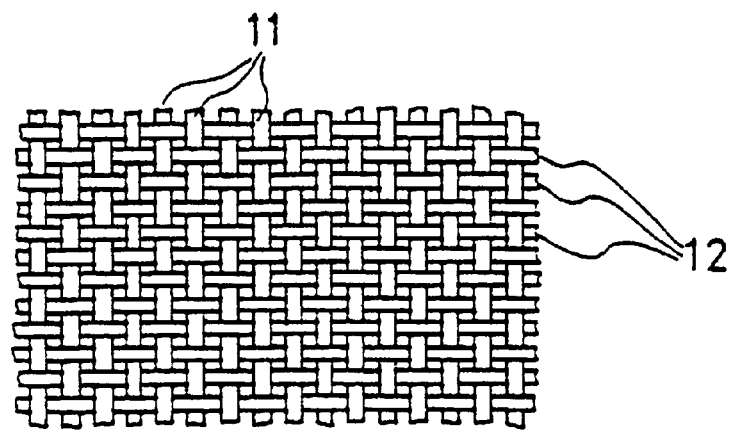
FIG. 4 is a partial plan view of a synthetic fiber woven fabric according to the present invention.
Figure 5:
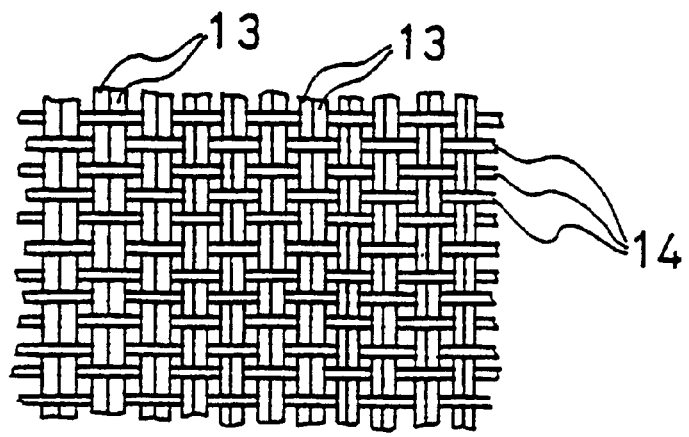
FIG. 5 Is a partial plan view of another synthetic fiber woven fabric according to the present invention.
Figure 6:
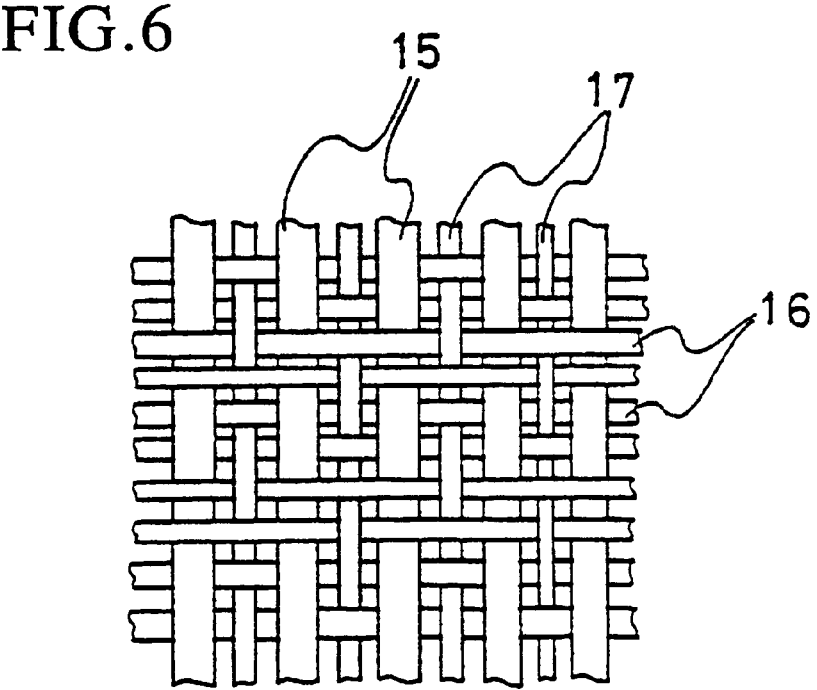
FIG. 6 is a partial plan view of another synthetic fiber woven fabric according to the present invention.

The structure of the woven fabric of the synthetic fiber woven fabric constituting the reinforcing layer used for the present invention is not particularly limited and it is possible to employ various structures such as a structure in which one weft 12 is entwined with each warp 11 as shown in FIG. 4, a structure in which one weft 14 is entwined with two warps 13 as shown in FIG. 5 and a structure in which both warp 15 and weft 16 are disposed linearly and are entwined and woven by twining yarns 17, or a so-called "unicorn" structure as shown in FIG. 6. Among them, the unicorn fabric is a preferred woven fabric for the conveyor belt according to the present invention which receives large tension in the belt longitudinal direction because the warps are linearly disposed.

A tyre fabric of the synthetic fibers such as the aforementioned polyester fiber and nylon fiber can be used as the synthetic fiber woven fabric. When the tyre fabric is used, canvas is preferably disposed on either one, or both, of the upper and lower surfaces of the tyre fabric. The canvas may have any fabric structure and may be constitute by any fibers. To prevent break of the conveyor belt due to abnormal deformation and from the aspect of the fatigue resistance, the canvas preferably has an elongation at break of at least 25% in the belt longitudinal direction.

As described already, the conventional conveyor belt is likely to undergo abnormal deformation and is likely to be damaged when the foreign matters such as the cake adhering to the pullies and the falling transported materials are caught between the pullies and the conveyor belt. Even though this abnormal deformation remains at such a level that does not directly invite the damage, repetition of such abnormal deformation invites early fatigue and the deterioration of the strength, so that the conveyor belt cannot withstand an extended use.

This problem can be solved by preventing the occurrence of a large stress concentration on the synthetic fiber woven fabric constituting the reinforcing layer even when the conveyor belt receives such abnormal deformation, and this can be achieved by increasing the elongation of the synthetic fiber woven fabric in the belt longitudinal direction when the belt receives a large load. Therefore, the present invention increases the elongation at break of the synthetic fiber woven fabric to at least 25% in the belt longitudinal direction so that conveyor belt can easily undergo deformation under a large load and the stress concentration can be mitigated.

In the conventional belt, further, the elongation develops in the course of use and the entire length of the belt often becomes greater. This problem can be solved by minimizing the elongation in the longitudinal direction of the synthetic fiber woven fabric (belt longitudinal direction) resulting from the normal load during the normal use.

Generally, the normal load is set to around 10% of the guarantee strength. Therefore, the present invention keeps the elongation in the belt longitudinal direction at a small level by limiting the elongation in the longitudinal direction to not greater than 1.5% at a load 10% of the guarantee strength.

The polyester fiber and the nylon fiber have been used for the synthetic fiber woven fabric of the conventional belt conveyor. Some of these fibers have an elongation at the 10% load which is approximate to that of the present invention but the elongation is generally greater. Particularly, the elongation of the nylon fiber is greater.

On the other hand, the elongation at break of the synthetic fiber woven fabric of the conventional conveyor belt is considerably smaller than that of the conveyor belt of the present invention, and is particularly smaller with the polyester fiber. It has been easy in the past to obtain other fibers having a large elongation at break but in this case, the elongation at the 10% load is also great.

However, a certain specific fiber such as the high elongation polyester and the high elongation nylon used in the present invention which have not been used ordinarily in the conventional conveyor belts can limit the elongation at the 10% load to a smaller one and can keep the elongation at break at a high level. Therefore, both of them are allowed to operate satisfactorily.

EXAMPLES AND COMPARATIVE EXAMPLES (a) Conveyor belts of the present invention (Examples 1 to 7) using the materials tabulated in Table 1 for the synthetic fiber woven fabrics constituting the reinforcing layer and conventional conveyor belts (Comparative Examples 1 and 2) were produced, respectively, and a bending running test and a catch running test were carried out.

Incidentally, the synthetic fiber woven fabric of Example 6 was produced by using the warps obtained by arranging alternately the yarns of the ordinary polyester and the yarns of ordinary nylon, the synthetic fiber woven fabric of Example 7 was produced by using the warps obtained by mix-twisting the ordinary polyester fiber and the ordinary nylon fiber, and the synthetic fiber woven fabrics of other Examples and Comparative Examples used the yarns obtained by twisting the fibers of the materials tabulated in Table 1 for the warps.

The fabric structure of the synthetic fiber woven fabric was the so-called "unicorn" fabric shown in FIG. 6 for all of the Examples and Comparative Examples.

Figure 2:
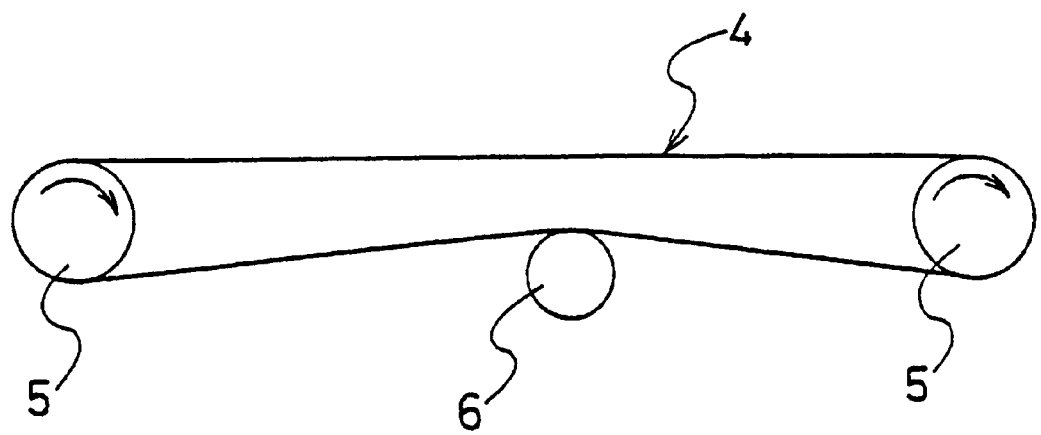
FIG. 2 is a schematic view of a bending running tester of the conveyor belt.

Next, the bending running test was carried out by a bending running tester shown in FIG. 2. Each belt testpiece 4 was passed around a pair of running pullies 5 and 5 and was pressed by a bend pulley 6. The elongation at a load 10% of the belt guarantee strength and the elongation at break were measured after each testpiece was rotated 5,000,000 turns. Those testpieces which exhibited a small change before and after the test had a small belt elongation.

Figure 3:
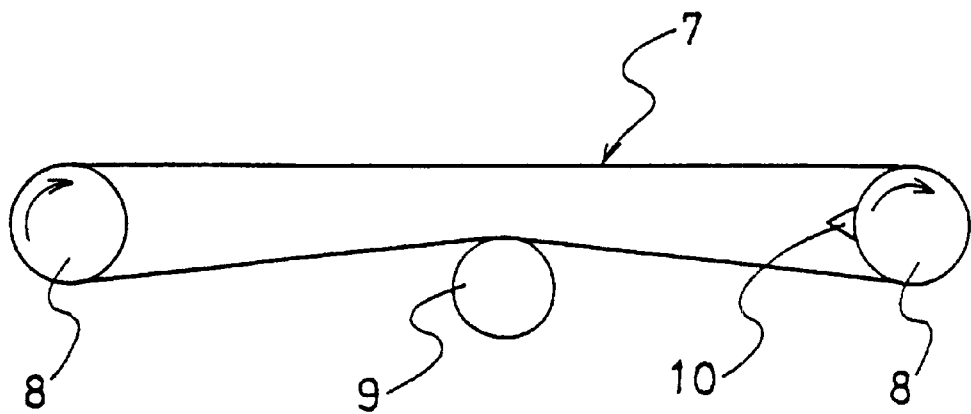
FIG. 3 is a schematic view of a catch running tester of the conveyor belt.

The test condition was as follows:

belt speed: 230 m/min belt tensile strength: $1/15$ of belt breaking strength diameter of running pullies: 500 mm diameter of bend pulley: 315 mm The catch running test was carried out by using a catch running tester shown in FIG. 3. Each belt testpiece 7 was passed around a pair of running pullies 8 and 8 and was pressed by a bend pulley 9. A projection 10 was provided to one of the running pullies 8 and 8. This projection 10 assumed the foreign matter that was caught. The strength of the belt was measured after the belt was rotated and run and the drop ratio of the strength before and after the test was determined. Those belts which had a small ratio of deterioration were difficult to be damaged.

The test condition was as follows:

belt speed: 150 m/min belt tensile strength: $1/15$ of belt breaking strength diameter of running pullies: 600 mm diameter of bend pulley: 600 mm projection height: 45 mm Table 1 illustrates the materials of the fibers used in Examples and Comparative Examples, the properties of the raw yarns before the adhesive solution treatment, the treating condition of the adhesive solution and the properties of the yarns after the adhesive solution treatment. The adhesive solution treatment was carried out by using resorcin formalin rubber latex (RFL) and heat-treating the yarns immersed in this solution at the temperatures and under the tensions tabulated in Table 1.

Table 2 illustrates the properties of the synthetic fiber woven fabrics in the belt longitudinal direction before the test, their properties after the bending running test and their properties after the catch running test.

TABLE 1

| | fiber material of warp | raw yarn properties | | bonding treatment condition | | properties after adhesive solution treatment | | |
|---|---|---|---|---|---|---|---|---|
| | | strength g/d | elongation at break % | temperature °C. | Tension g/d | strength kg/cm² | 10% elongation % | elongation at break % |
| Example 1 | high elongation polyester | 5.3 | 32 | 205 | 0.18 | 204 | 1.2 | 29 |
| Example 2 | high elongation polyester | 4.2 | 55 | 205 | 0.14 | 194 | 1.3 | 41 |
| Example 3 | high elongation polyester | 6.5 | 40 | 200 | 0.26 | 188 | 1.3 | 31 |
| Example 4 | high elongation polyester | 6.3 | 31 | 200 | 0.26 | 205 | 1.4 | 30 |
| Example 5 | high elongation nylon | 8.3 | 27 | 205 | 0.28 | 209 | 3.0 | 32 |
| Example 6 | alternate arrangement of ordinary polyester and | 9.0 | 13 | 205 | 0.27 | 257 | 2.3 | 26 |

TABLE 1-continued

| | fiber material of warp | raw yarn properties | | bonding treatment condition | | properties after adhesive solution treatment | | |
|---|---|---|---|---|---|---|---|---|
| | | strength g/d | elongation at break % | temperature °C. | Tension g/d | strength kg/cm² | 10% elongation % | elongation at break % |
| Example 7 | ordinary nylon | 9.2 | 20 | | | | | |
| | mix-twisting of ordinary polyester and ordinary nylon | 9.0 | 13 | 205 | 0.26 | 213 | 2.2 | 22 |
| | | 9.2 | 20 | | | | | |
| Comp. Example 1 | ordinary polyester | 9.0 | 13 | 200 | 0.23 | 234 | 1.6 | 17 |
| Comp. Example 2 | ordinary polyester | 8.5 | 13 | 200 | 0.23 | 216 | 1.7 | 14 |

TABLE 2

| | properties of woven fabric before test | | properties of woven fabric after bending running test | | properties of woven fabric after catch running test |
|---|---|---|---|---|---|
| | elongation at 10% load % | elongation at break % | elongation at 10% load % | elongation at break % | drop ratio of strength before and after test % |
| Example 1 | 1.3 | 36.7 | 1.5 | 27.3 | 1.9 |
| Example 2 | 1.3 | 58.0 | 1.5 | 55.7 | 1.4 |
| Example 3 | 1.2 | 36.8 | 1.3 | 29.0 | 5.9 |
| Example 4 | 1.2 | 30.7 | 1.2 | 27.2 | 8.4 |
| Example 5 | 1.4 | 29.7 | 1.5 | 27.0 | 9.0 |
| Example 6 | 1.0 | 27.0 | 1.2 | 25.0 | 9.5 |
| Example 7 | 1.4 | 26.0 | 1.5 | 25.0 | 8.0 |
| Comp. Example 1 | 1.7 | 19.0 | 1.3 | 18.0 | 14.6 |
| Comp. Example 2 | 1.0 | 14.0 | 1.5 | 16.8 | 28.3 |

(b) Conveyor belts were produced by constituting the reinforcing layer by a tyre fabric and disposing canvas below the reinforcing layer (Examples 8 to 11), and the bending running test and the catch running test were carried out in the same way as in the item (a). A woven fabric of a plain fabric made of a nylon fiber was used as the canvas.

Table 3 illustrates the properties of the fibers used, the properties of the raw yarns before the adhesive solution treatment, the treating condition of the adhesive solution and the properties of the yarns after the adhesive 15 solution treatment in Examples 8 to 11. Resorcin formalin rubber latex (RFL) was used for the adhesive solution, and the yarns immersed in this solution were heat-treated at the temperature and under the tension shown in Table 3.

Table 4 illustrates the properties of the tyre fabric in the belt longitudinal direction before the test, its properties after the bending running test and its properties after the catch running test in Examples 8 to 11.

TABLE 3

| | fiber properties of warps | raw yarn properties | | Bonding treatment condition | | properties after adhesive solution treatment | | |
|---|---|---|---|---|---|---|---|---|
| | | strength g/d | elongation at break % | temperature °C. | tension g/d | strength kg/cm² | 10% elongation % | elongation at break % |
| Example 8 | high elongation polyester | 6.3 | 31 | 200 | 0.26 | 205 | 1.4 | 30 |
| Example 9 | high elongation nylon | 8.3 | 27 | 205 | 0.28 | 209 | 3.0 | 32 |
| Example 10 | alternate arrangement of ordinary polyester | 9.0 | 13 | 205 | 0.27 | 257 | 2.3 | 26 |

TABLE 3-continued

| | fiber properties of warps | raw yarn properties | | Bonding treatment condition | | properties after adhesive solution treatment | | |
|---|---|---|---|---|---|---|---|---|
| | | strength g/d | elongation at break % | temperature °C | tension g/d | strength kg/cm² | 10% elongation % | elongation at break % |
| Example 11 | and ordinary nylon | 9.2 | 20 | | | | | |
| | mix-twisting of ordinary polyester | 9.0 | 13 | 205 | 0.26 | 213 | 2.2 | 22 |
| | and ordinary nylon | 9.2 | 20 | | | | | |

TABLE 4

| | properties of woven fabric before test | | properties of woven fabric after bending running test | | properties of woven fabric after catch running test |
|---|---|---|---|---|---|
| | elongation at 10% load % | elongation at break % | elongation at 10% load % | elongation at break % | drop ratio of strength before and after test % |
| Example 8 | 1.1 | 31.0 | 1.2 | 30.1 | 6.7 |
| Example 9 | 1.3 | 28.9 | 1.4 | 28.0 | 8.0 |
| Example 10 | 1.1 | 28.0 | 1.2 | 26.0 | 9.2 |
| Example 11 | 1.3 | 27.5 | 1.4 | 26.2 | 8.6 |

As described above, the present invention provides a conveyor belt whose synthetic fiber woven fabric constituting the reinforcing layer has the elongation at break of at least 25% in the belt direction and the elongation of not greater than 1.5% at a load 10% of the guarantee strength. Therefore, the conveyor belt has the following excellent effects.

(1) Because the elongation at a load 10% of the guarantee strength is not greater than 1.5%, the elongation of the belt during the use is small. Therefore, even when the conveyor belt is used for a long time, the elongation of the belt entire length is small and consequently, the cutting-short operation of the belt and the adjustment of the machine length are hardly necessary. Further, the stroke of the take-up device can be reduced.

(2) Although the elongation at the 10% load is small, the elongation at break is as great as at least 25%. Therefore, the belt can easily stretch against any abnormal deformation that occurs when the foreign matters such as the cake adhering to the pullies and the falling transported matters are caught between the pullies and the conveyor belt, and the stress concentration is small. Therefore, the conveyor belt is almost free from such problems as the direct cut and early cut due to the fatigue resulting from the repetition of the stress concentration.

(3) For these reasons, maintenance and inspection of the conveyor belt according to the present invention is easy, and the number of workers and the cost for maintenance and inspection can be reduced.

What is claimed is:

1. A conveyor belt having a reinforcing layer of a synthetic fiber woven fabric embedded between an upper surface cover and a lower surface cover, characterized in that an elongation at break of said synthetic fiber woven fabric in a belt longitudinal direction is at least 25% and an elongation at a load 10% of a breakage load is not higher than 1.5%.

2. A conveyor belt according to claim 1, wherein warps of said synthetic fiber woven fabric are yarns comprising a high elongation polyester fiber.

3. A conveyor belt according to claim 1, wherein warps of said synthetic fiber woven fabric are yarns comprising a high elongation nylon fiber.

4. A conveyor belt according to claim 1, wherein said synthetic fiber woven fabric is a woven fabric obtained by arranging alternately one to three warps of a polyester fiber and one to three warps of a nylon fiber.

5. A conveyor belt according to claim 1, wherein said warp of said synthetic fiber woven fabric is a mix-twisted yarn of a polyester fiber and a nylon fiber.

6. A conveyor belt according to any of claims 1 through 5, wherein said warp of said synthetic fiber woven fabric is subjected to adhesive solution treatment at temperatures not lower than 200° C.

7. A conveyor belt according to any of claims 1 through 5, wherein said warp of said synthetic fiber woven fabric is subjected to adhesive solution treatment under a set tension of not greater than 0.2 g/deniers.

8. A conveyor belt according to any of claims 1 through 5, wherein said synthetic fiber woven fabric has a fabric structure in which warps and wefts are linearly disposed, are entwined by twining yarns and are woven.

9. A belt conveyor according to any of claims 1 through 5, wherein said synthetic fiber woven fabric is a tyre fabric of a synthetic fiber.

10. A conveyor belt according to any one of claims 1 to 5, wherein said elongation at break is 27% to 35%.

11. A conveyor belt according to any one of claims 1 to 5, wherein said elongation at a load 10% of guarantee strength is 0.5% to 1.3%.

* * * * *